(12) United States Patent
Zhao

(10) Patent No.: US 9,983,076 B2
(45) Date of Patent: May 29, 2018

(54) SOLAR BATTERY WIRELESS LOAD CELL ADAPTER

(71) Applicant: BODE ENERGY EQUIPMENT CO., LTD., Xi'an (CN)

(72) Inventor: Min Zhao, Xi'an (CN)

(73) Assignee: BODE ENERGY EQUIPMENT CO., LTD., Xi'an (CN)

( * ) Notice: Subject to any disclaimer, the term of this patent is extended or adjusted under 35 U.S.C. 154(b) by 0 days. days.

(21) Appl. No.: 14/828,706

(22) Filed: Aug. 18, 2015

(65) Prior Publication Data

US 2017/0052078 A1    Feb. 23, 2017

(51) Int. Cl.
*G01L 5/00*  (2006.01)
*H02J 7/35*  (2006.01)
*E21B 43/12*  (2006.01)
*E21B 47/00*  (2012.01)
*F04B 17/00*  (2006.01)
(Continued)

(52) U.S. Cl.
CPC ............. *G01L 5/00* (2013.01); *E21B 43/127* (2013.01); *E21B 47/0008* (2013.01); *F04B 17/006* (2013.01); *F04B 47/02* (2013.01); *F04B 49/065* (2013.01); *H02J 7/35* (2013.01); *F04B 2201/0201* (2013.01);
(Continued)

(58) Field of Classification Search
CPC .. E21B 47/0008; E21B 43/127; F04B 49/065; F04B 17/006; G01D 21/02; H01B 9/003; H02J 7/35; H02J 7/355; G01L 5/00; G01B 21/00; H02S 20/20; H02S 30/10; Y02E 10/566; Y02P 80/158

USPC ..... 73/152.61, 152.01, 781; 417/63; 166/66; 136/251
See application file for complete search history.

(56) References Cited

U.S. PATENT DOCUMENTS 4,143,546 A    3/1979 Wiener
4,363,605 A   12/1982 Mills
(Continued)

FOREIGN PATENT DOCUMENTS

CN    2714804 Y    8/2005
CN    2937474 Y    8/2007
(Continued)

OTHER PUBLICATIONS

Photo Tech, Mounting Wall Bracket Unit, Jan. 8, 2002.*
(Continued)

*Primary Examiner* — Peter Macchiarolo
*Assistant Examiner* — David L Singer
(74) *Attorney, Agent, or Firm* — Morgan Lewis & Bockius LLP

(57) ABSTRACT

An adapter for a load cell in a rod pump system includes an outer shell including a mounting portion configured to attach to the load cell on a polished rod, a power supply configured to provide power to the adapter and the load cell, the power supply including a solar panel on the outer shell, a cable configured to connect to the load cell, the adapter configured to provide power to the load cell via the cable, and the adapter configured to receive a load signal from the load cell via the cable, a signal processor configured to receive and process the load signal and to output load signal data representative of a load experienced by the load cell, and a wireless transmitter to transmit the load signal data.

7 Claims, 10 Drawing Sheets

(51) Int. Cl.
*F04B 47/02* (2006.01)
*F04B 49/06* (2006.01)

(52) U.S. Cl.
CPC . *F04B 2201/121* (2013.01); *F04B 2201/1211* (2013.01); *Y02E 10/566* (2013.01); *Y02P 80/158* (2015.11)

(56) References Cited

U.S. PATENT DOCUMENTS

| | | | |
|---|---|---|---|
| 4,390,321 | A | 6/1983 | Langlois et al. |
| 4,490,816 | A | 12/1984 | Kehl |
| 4,561,299 | A | 12/1985 | Orlando et al. |
| 4,594,665 | A | 6/1986 | Chandra et al. |
| 5,064,349 | A | 11/1991 | Turner et al. |
| 5,182,946 | A | 2/1993 | Boughner et al. |
| 5,291,777 | A | 3/1994 | Chang et al. |
| 6,114,632 | A * | 9/2000 | Planas, Sr. ............. H01B 9/003 174/117 R |
| 6,315,523 | B1 * | 11/2001 | Mills ................... F04B 47/02 307/150 |
| 6,576,849 | B2 | 6/2003 | Bliss et al. |
| 7,219,723 | B2 | 5/2007 | Barnes et al. |
| 7,345,374 | B1 | 3/2008 | Jones et al. |
| 7,513,752 | B2 | 4/2009 | Boone et al. |
| 7,614,357 | B2 | 11/2009 | Hernandez et al. |
| 7,856,727 | B2 | 12/2010 | Chiorean et al. |
| 7,944,369 | B2 | 5/2011 | Appleyard et al. |
| 8,157,537 | B2 | 4/2012 | Chavez Zapata |
| 8,421,400 | B1 | 4/2013 | Khanna |
| 8,769,839 | B1 | 7/2014 | Paesano et al. |
| 8,780,055 | B2 * | 7/2014 | Marchand ............ G06F 1/3215 345/173 |
| 8,866,470 | B2 | 10/2014 | Taylor |
| 8,946,937 | B2 | 2/2015 | Stratakos et al. |
| 9,080,438 | B1 * | 7/2015 | McCoy ................... E21B 47/18 |
| 9,255,506 | B2 | 2/2016 | Cook |
| 2004/0144529 | A1 * | 7/2004 | Barnes .................... F04B 47/02 166/53 |
| 2004/0155860 | A1 * | 8/2004 | Wenstrand ............ G06F 1/3203 345/156 |
| 2005/0089425 | A1 * | 4/2005 | Boone ................ E21B 47/0008 417/448 |
| 2006/0238336 | A1 | 10/2006 | Zajac et al. |
| 2009/0071645 | A1 | 3/2009 | Kenison et al. |
| 2009/0121849 | A1 | 5/2009 | Whittaker |
| 2009/0311107 | A1 | 12/2009 | Zapata |
| 2011/0074334 | A1 | 3/2011 | Wang et al. |
| 2012/0020808 | A1 | 1/2012 | Lawson et al. |
| 2012/0112546 | A1 | 5/2012 | Culver |
| 2012/0135629 | A1 * | 5/2012 | Montena ............... H01R 12/70 439/359 |
| 2012/0222935 | A1 | 9/2012 | MacKay et al. |
| 2013/0127390 | A1 | 5/2013 | DaCunha et al. |
| 2013/0294952 | A1 | 11/2013 | Caprathe |
| 2013/0333880 | A1 | 12/2013 | Raglin et al. |
| 2015/0345280 | A1 | 12/2015 | Krauss |

FOREIGN PATENT DOCUMENTS

| | | |
|---|---|---|
| CN | 201159059 Y | 12/2008 |
| CN | 102434147 A | 5/2012 |
| CN | 102519494 A | 6/2012 |
| CN | 202329895 U | 7/2012 |
| CN | 202417478 U | 9/2012 |
| CN | 202707004 U | 1/2013 |
| CN | 102966346 A | 3/2013 |
| CN | 202882884 U | 4/2013 |
| GB | 2475074 A | 5/2011 |
| GB | 24750574 A | 5/2011 |
| WO | 2010/114916 A1 | 10/2010 |
| WO | 2014098873 A1 | 6/2014 |

OTHER PUBLICATIONS

Solar-Colorado, Optimizing Solar Panel Performance, 2011.*
Landau, Optimum Tilt of Solar Panels, 2012.*
Machine Translation of Applicant Cited CN202329895.*
PCT Notification of Transmittal of the International Search Report and the Written Opinion of the International Searching Authority dated Oct. 12, 2015 in PCT/IB2015/053311.
PCT Notification of Transmittal of the International Search Report and the Written Opinion of the International Searching Authority dated Feb. 16, 2016 in PCT/CN2015/094959.
USPTO Office Action dated Apr. 21, 2016 in related technology U.S. Appl. No. 14/467,574.
USPTO Office Action dated Oct. 4, 2016 in related technology U.S. Appl. No. 14/272,105.
USPTO Office Action dated Oct. 17, 2016 in related technology U.S. Appl. No. 14/547,345.
Klimitchek, Randal, et al. "Integrated rod-pump controller cuts operating costs," Petroleum Technology Digest, reprinted from World Oil, Oct. 2003 Issue, pp. 1-2.
Tuominen, Juha "Hydraulic Boom Monitoring with IEEE 802.11 Based Wire Sensor Network," Master of Science Thesis, Tampere University of Technology, Apr. 2010, pp. 1-79.
Weatherford, WellPilot-ePIC Intelligent VSD/ RPC User Manual, Jul. 2010, Revision B, Table of Contents and "Polished Rod Load Cell Sensor TDS" and "Beam Mounted Load Sensor TDS" portions of Section 6.
USPTO Office Action dated May 25, 2017 in technologically related U.S. Appl. No. 14/547,345.
International Search Report and Written Opinion dated Nov. 7, 2016 from counterpart PCT application No. PCT/CN2016/095883.
Communication dated Oct. 19, 2017 in technologically related EP Application No. 15788989.0.
USPTO Office Action dated Feb. 23, 2018, in technologically related U.S. Appl. No. 15/630,522.

* cited by examiner

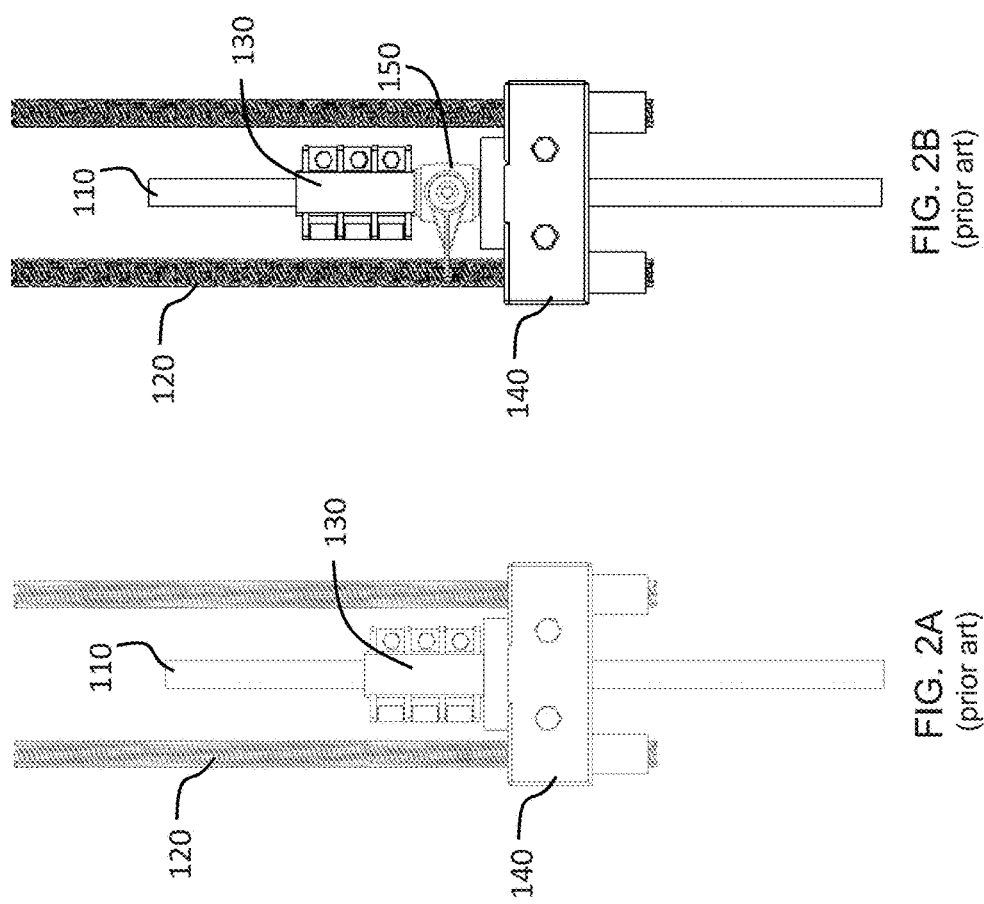

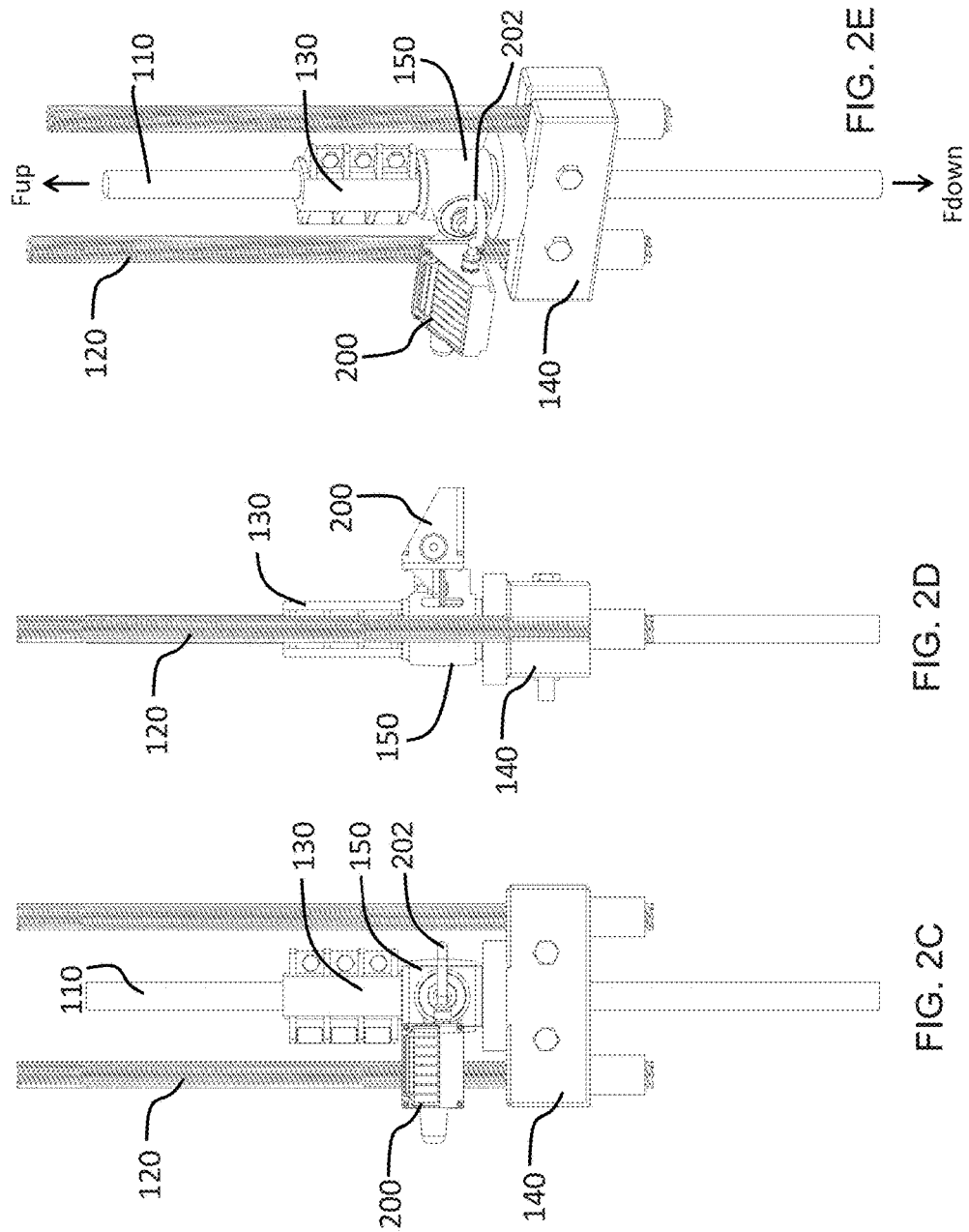

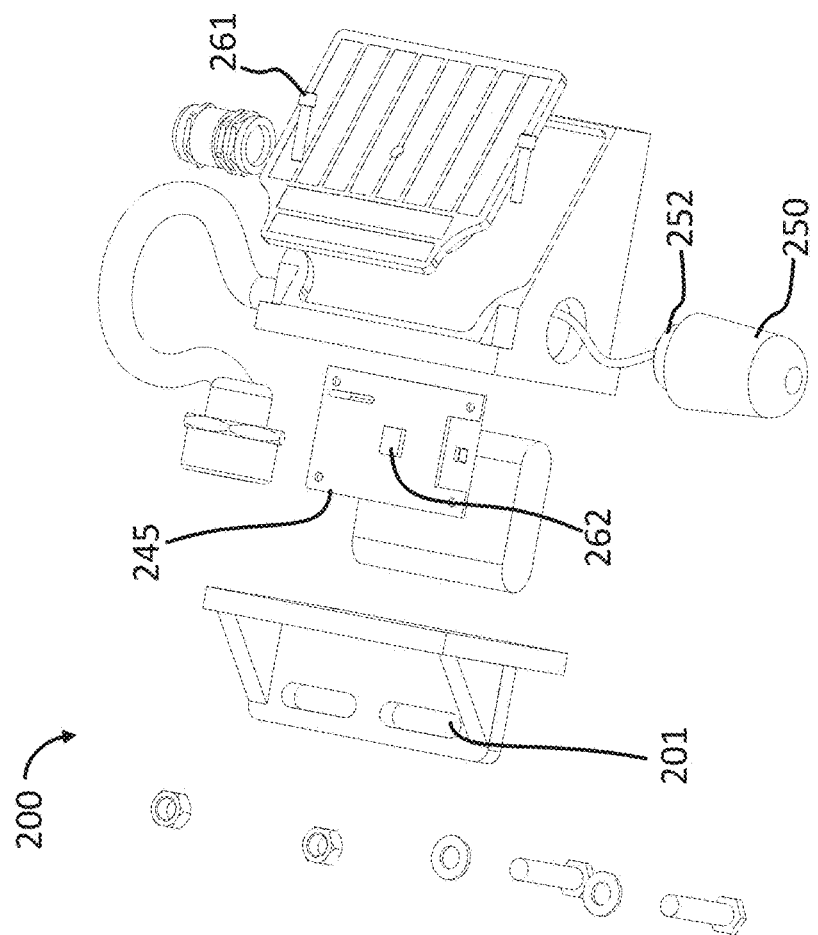

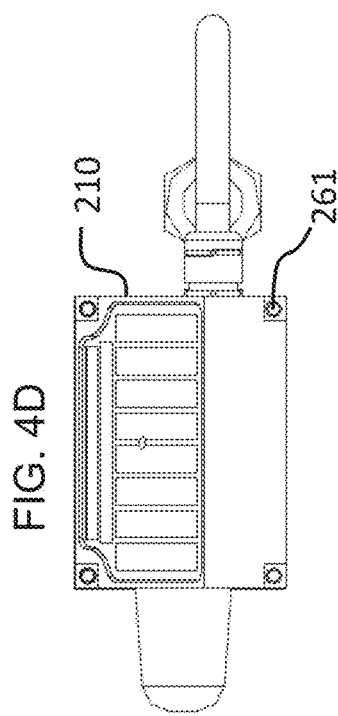
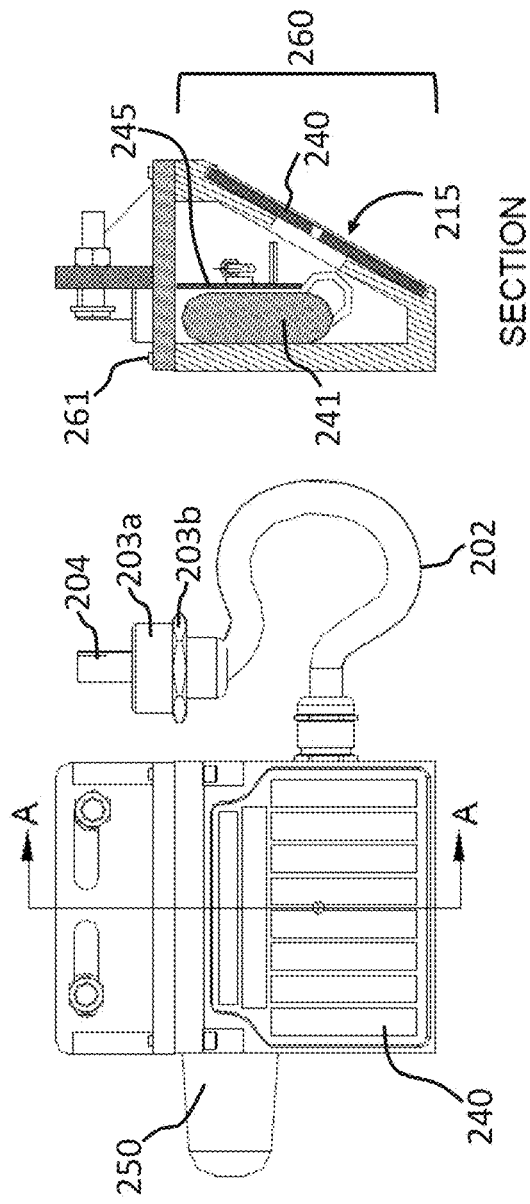
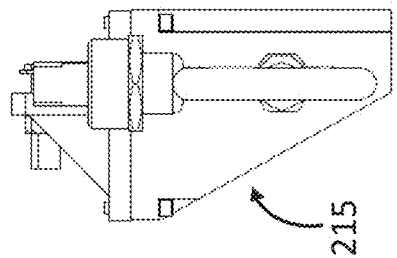

SOLAR BATTERY WIRELESS LOAD CELL ADAPTER

FIELD OF THE INVENTION

Embodiments of the present invention relate generally to rod pumping systems. For example, embodiments relate to an apparatus that connects to a load cell installed on a polished rod in a rod pumping system. The apparatus may measure the angle of the walking beam and/or the position of the polished rod and wirelessly transmit this data together with the load on the polished rod as measured by the load cell.

BACKGROUND

In the field of oil well rod pumping systems, it is desirable to monitor the strain (or "load") on the polished rod. In this way, malfunctions in the system can be detected and resolved to protect an oil pump from damage. Various solutions have been proposed for how to measure this force on the polished rod. For example, U.S. Pat. Pub. No. 2010/0020808 to Lawson et al. proposes two separate load cells that are "stacked" from the top of the polished rod and respectively measure an upward and a downward force on the polished rod. In order to measure the total force acting on the polished rod, the load cells encircle the polished rod in a ring shape, and are stacked from the top of the polished rod at installation.

Lawson describes an example of a load cell that completely encircles a circumference of the polished rod, and that must therefore be installed from the top of the rod. Such load cells are often used in the field of rod pumping systems. For example, FIG. 2B illustrates a rod pumping system in which a load cell 150 has been installed on polished rod 110 between clamp 130 and clamping bar 140.

Some systems replace the load cell 150 with a load cell that is easily removable from the polished rod 110 and that may, for example, wirelessly transmit load cell data (see, for example, U.S. patent application Ser. No. 14/272,105). However, if a load cell 150 that completely encircles the polished rod is already installed, as illustrated by example in FIG. 2B, removal of the load cell 150 may first need to take place before a different load cell can be installed. Because the load cell 150 is stacked from the top of the polished rod and is positioned between clamp 130 and clamping bar 140, removal can be difficult and time-consuming, and may not always be feasible.

Also, the position of a polished rod (which may correspond to the angle of the walking beam) can be an important metric for determining proper operation of a rod pumping system. Inclinometers are used in rod pumping systems to measure the angle of a walking beam, often by way of such position sensing. For example, an inclinometer installed on a beam of a polished rod pumping system may be used to determine the running distance of the polished rod during pumping operation. Based on the polished rod running distance, information on the pump running status can be obtained.

Existing inclinometers are typically powered by an external power supply, which is often an independent power source needing regular replacement and maintenance. U.S. Pat. No. 7,219,723 to Barnes shows an example of an external power supply. Because the power supply is external to the inclinometer, resulting wires are easily damaged due to the environment (e.g., water and heat). Water can also leak into the inclinometer at the places where the external wires are connected to the inclinometer. Furthermore, installation of the inclinometer is difficult due to the separate external power supply and other external components. Attaching such an inclinometer to the walking beam can be awkward, but placement should be precise in order to obtain accurate measurements.

Furthermore, in "wired" load cells such as those described above, wire(s) connect the load cell to the rest of the pump unit in order to transmit the load signal. However, these wires can be broken by the wind and/or mechanical stress.

SUMMARY

Accordingly, the present invention is directed to an adapter that may substantially obviate one or more problems due to limitations and disadvantages of the related art.

To achieve these and other advantages and in accordance with the purpose embodiments of the invention, as embodied and broadly described herein, an adapter for a load cell in a rod pump system includes: an outer shell including a mounting portion configured to attach to the load cell on a polished rod, a power supply configured to provide power to the adapter and the load cell, the power supply including a solar panel on the outer shell, a cable configured to connect to the load cell, the adapter configured to provide power to the load cell via the cable, and the adapter configured to receive a load signal from the load cell via the cable, a signal processor configured to receive and process the load signal and to output load signal data representative of a load experienced by the load cell, and a wireless transmitter to transmit the load signal data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention that together with the description serve to explain the principles of embodiments of the invention. Throughout the drawings, same or similar reference numbers may be used to indicate same or similar parts. In the drawings:

FIG. 2A illustrates a connection system between a harness and a polished rod of the rod pumping system without a load cell installed;

FIG. 2B illustrates a connection system between a harness and a polished rod of the rod pumping system with a load cell installed;

FIG. 2C illustrates a front view of a connection system between a harness and a polished rod of the rod pumping system with a load cell and an example wireless load cell adapater installed on the load cell;

FIG. 2D illustrates a side view of FIG. 2C;

FIG. 2E illustrates a perspective view of FIG. 2C and shows upward and downward axial forces on the polished rod;

FIG. 4B shows an exploded view of a wireless load cell adapter according to an embodiment of the present invention;

FIG. 4C shows a top view of a wireless load cell adapter according to an embodiment of the present invention;

FIG. 4D shows a front view of a wireless load cell adapter according to an embodiment of the present invention;

FIG. 4E shows a side view of a wireless load cell adapter according to an embodiment of the present invention;

FIG. 4F shows a cross-section of a wireless load cell adapter according to an embodiment of the present invention at A-A of FIG. 4C;

DETAILED DESCRIPTION

Reference will now be made in detail to embodiments of the present invention, examples of which are illustrated in the accompanying drawings. It is to be understood that the figures and descriptions included herein illustrate and describe elements that may be of particular relevance to the present invention, while eliminating, for purposes of clarity, other elements found in typical rod pumping systems or methods.

Figure 1:
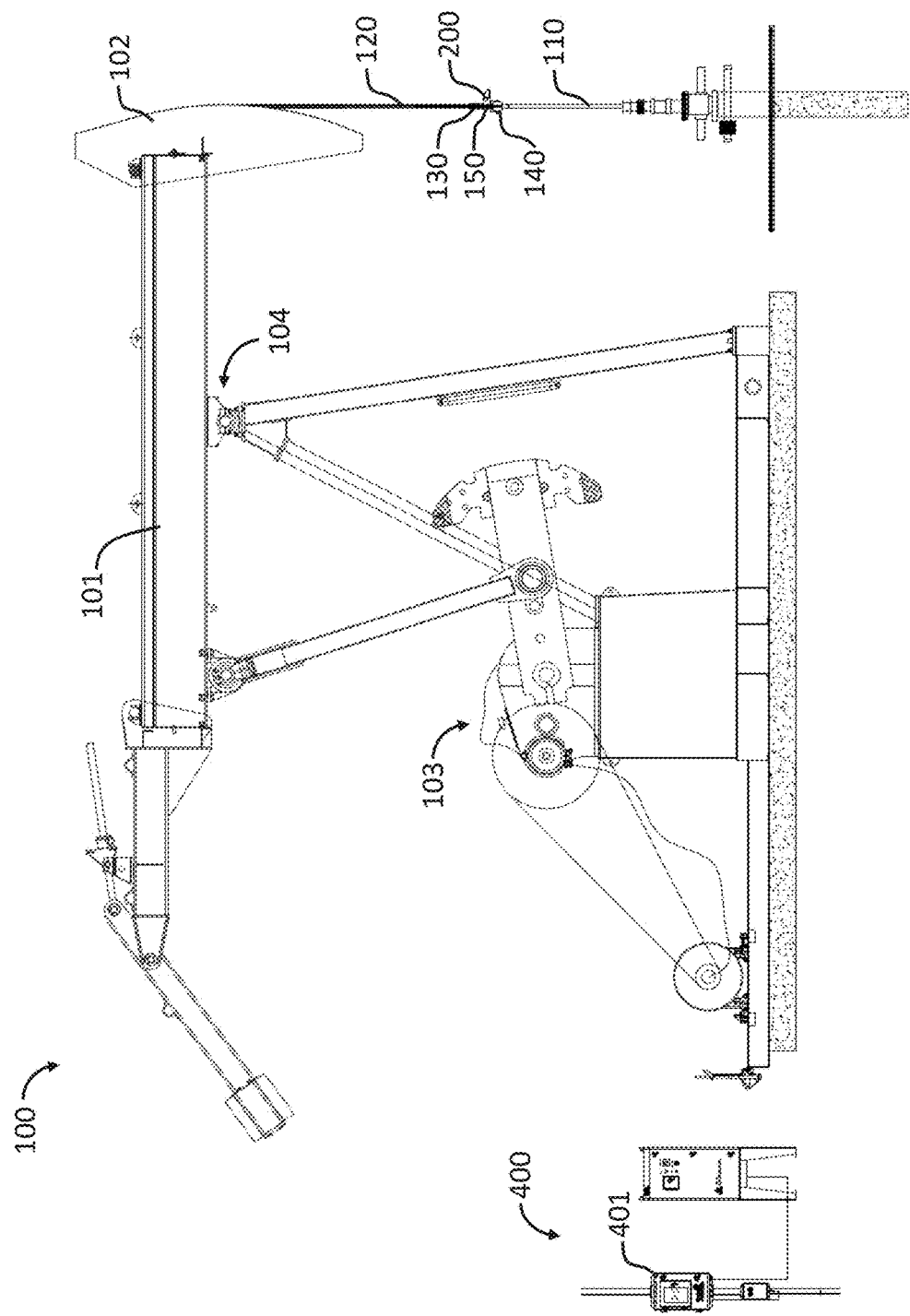
FIG. 1 illustrates an example rod pumping system including a load cell and an embodiment of a load cell adapter of the present invention.
Figure 3B:
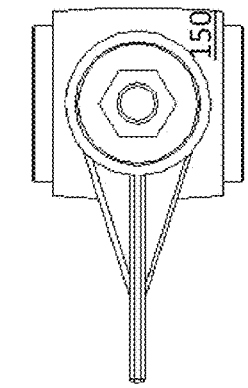
FIG. 3B shows a front view of a load cell.
Figure 3E:
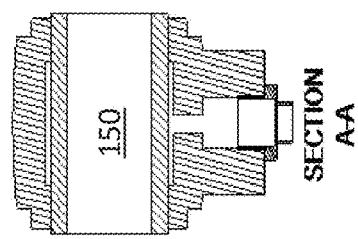
FIG. 3E shows a cross-section of a load cell at A-A of FIG. 3D.
Figure 3C:
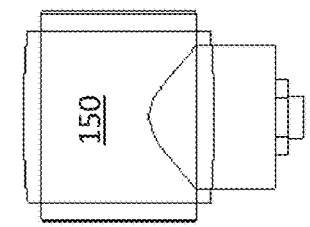
FIG. 3C shows a side view of a load cell.
Figure 3D:
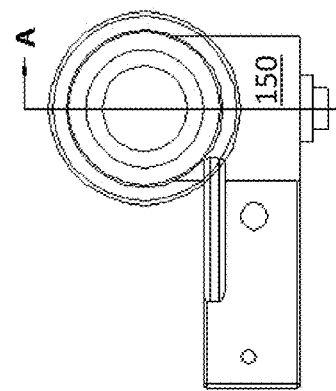
FIG. 3D shows a top view of a load cell.
Figure 3A:
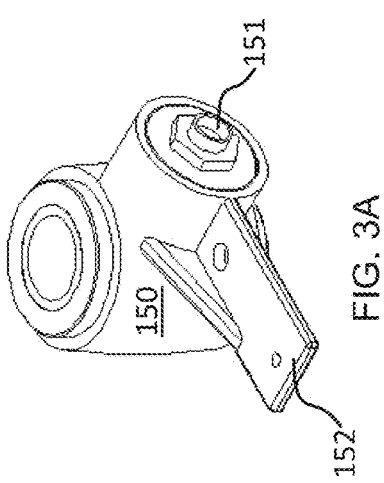
FIG. 3A illustrates a perspective view of a load cell.

FIG. 1 illustrates a rod pumping system 100 which may be used to pump oil and whose mechanisms are generally known in the art, together with a load cell 150 and an embodiment of a wireless load cell adapter 200 of the present invention. The example rod pumping system 100 includes a walking beam 101, horsehead 102, motor and gear drive 103, hanger harness 120, polished rod 110, polished rod clamp 130, and clamping bar 140. As the horsehead 102 moves up and down during operation of the rod pumping system 100, so do the hanger harness 120 and polished rod 110. During this operation, the load cell 150 is positioned to measure axial forces on the polished rod 110, and the adapter 200 is positioned to receive the measurements from the load cell 150 and to measure the position of the load cell 150.

FIG. 2A shows an example of a hanger harness 120 and polished rod 110 connection system, as may be used in the rod pumping system 100 of FIG. 1. The hanger harness 120 may be formed of materials, including, for example, rope or metal cable, and may connect to the horsehead 102 of the pumping system 100 as shown in FIG. 1. As the pumping system operates, the polished rod 110 may be subject to both an axially upward force or strain $F_{up}$ and an axially downward force or strain $F_{down}$ (see FIG. 2E). The polished rod clamp 130 may be fixed to the polished rod 110 and may thereby maintain the connection between the polished rod 110, the hanger harness 120, and the clamping bar 140.

As shown in FIG. 2B, the load cell 150 may already be placed between the existing clamping bar 140 and polished rod clamp 130 of the rod pumping system 100. For example, the load cell 150 may be installed by sequentially stacking the load cell 150 and the polished rod clamp 130 on the clamping bar 140 from the top of the polished rod 110. The load cell 150 may be configured such that when it is installed, its flat top and bottom surfaces are flush with the polished rod clamp 130 and the clamping bar 140, respectively. In this way, the forces acting upon the load cell 150 may accurately and directly reflect the forces acting upon the polished rod 110. For example, the load cell 150 may directly measure the combined upward and downward forces $F_{up}$ and $F_{down}$ (see FIG. 2E) exerted on the polished rod 110 through transducer(s) in the load cell 150. However, because the load cell 150 may be stacked from the top of the polished bar 110 at installation, it may be difficult to subsequently replace it with a different load cell once the polished rod clamp 130 is installed and the system is operational. The load cell 150 is typically connected by wire to, e.g., a controller or other measuring equipment of the rod pumping system 100, to receive power (e.g., voltage) and to transduce the load signal and send a signal (e.g., a voltage signal) proportionate to load to the controller.

With reference to FIGS. 3A-3E, which show an example embodiment of the load cell 150, the load cell 150 may include a terminal 151. The terminal may include a port for receiving a voltage for use by transducer(s) of the load cell 150, and a port for transmitting a load signal. A controller of the rod pumping system 100 typically connects to this terminal 151 via wire. The controller may supply power to the load cell 150 (including, e.g., a voltage used by the transducer(s) of the load cell 150), and may receive a voltage signal from the load cell that is proportionate to load. The signal may, for example, be a voltage signal generated by the transducer(s) in load cell 150 and may be proportionate to the load on the polished rod 110. As noted, in a typical installation, a wired system may connect to the terminal 151 to receive and monitor the load on the polished rod 110. However, in embodiments of the present invention, this wired system is replaced with the wireless load cell adapter 200.

For example, the adapter 200 is installed on a platform portion 152 of the load cell 150 via bolts 206. In an example embodiment, two M8*35 hex head bolts are used to fasten the adapter 200 to the load cell 150 at this platform portion 152. The bolts extend through two elongated openings 201 of the adapter 200 and are secured via nuts. In this way, adapter 200 may be fastened to load cells with different hole placements. The load cell 150 may connect to the load cell adapter 200 through the connector 204 via terminal 151, thereby converting the load cell 150 into a wireless load cell.

A cable 202 may include conductive pathways for the adapter to provide a voltage to the load cell 150, and for the load cell 150 to transmit a load signal to the adapter 200. At one end of the cable 202 is a connector 204 that is secured to the terminal 151 with a locking portion 203 including a threaded portion 203a and a nut-shaped portion 203b. In an example embodiment, the locking portion 203a is coated with tape (such as polytetrafluoroethylene, or "PTFE") to prevent water from interfering with the connection, and then threaded into terminal 151 of the load cell 150. The locking portion may be fastened tightly by rotating the nut-shaped portion 203b. A further screw nut 205 may tighten behind the locking portion 203 to help ensure a waterproof effect.

Figure 6B:
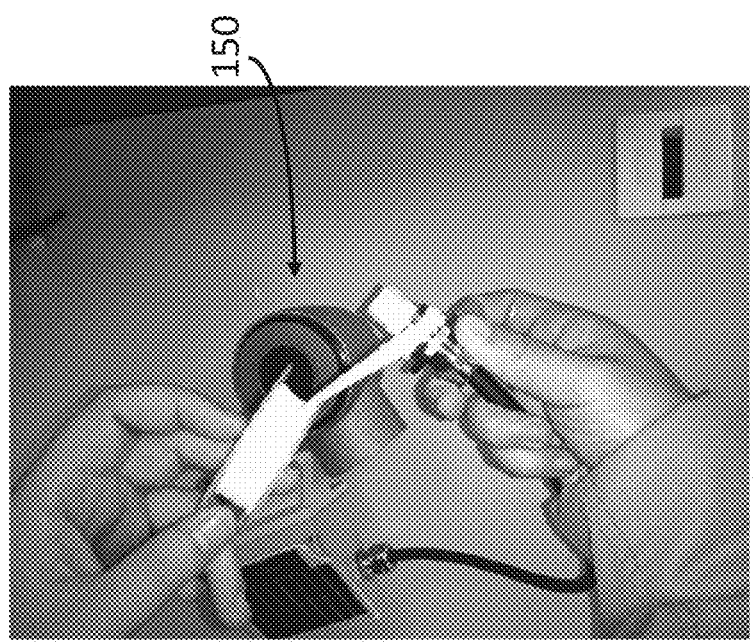
FIGS. 6A-6D show example photographical illustrations of installation of a wireless load cell adapter.
Figure 6A:
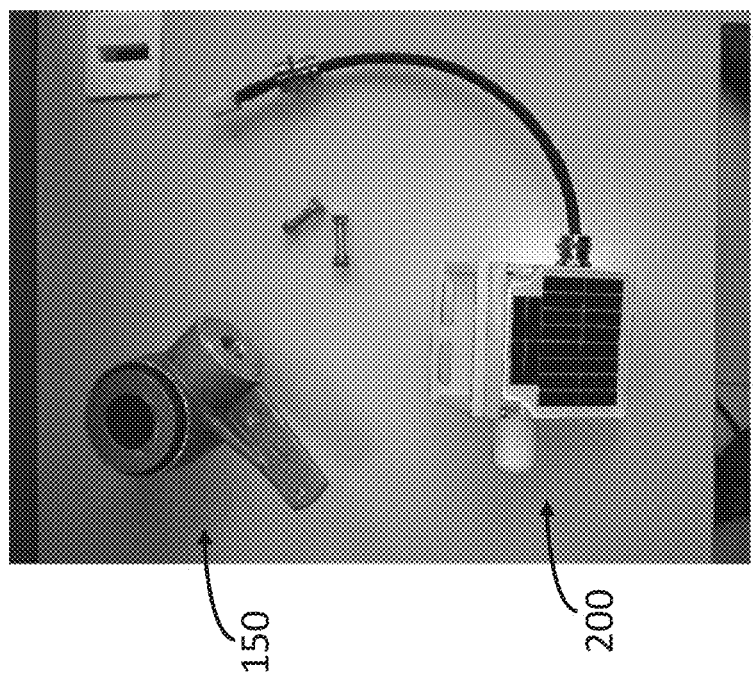
Figure 6D:
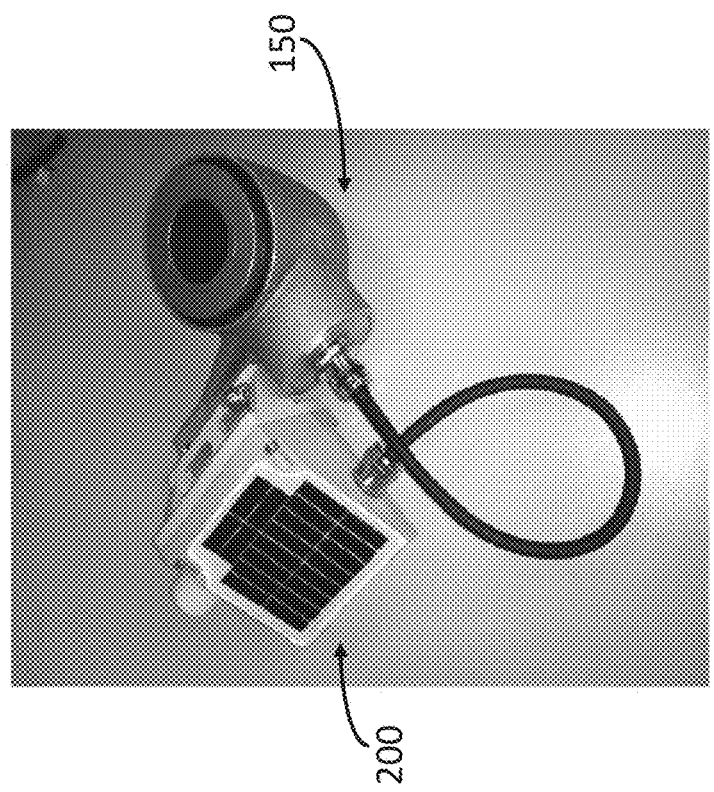
Figure 6C:
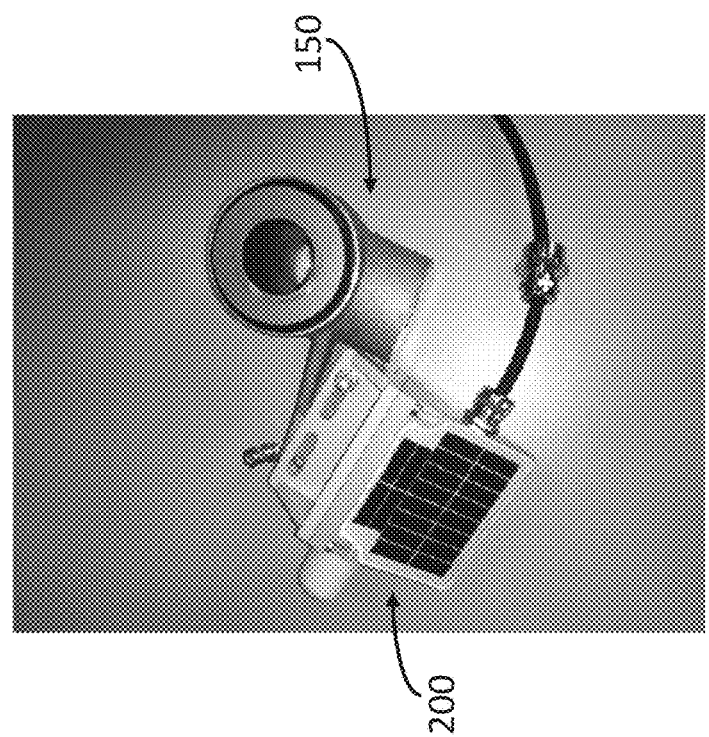

FIGS. 6A-6D show an example illustration of installing the adapter 200 on the load cell 200, including the application of tape in FIG. 6B. However, these drawings are for example only, as the adapter 200 may typically be installed on the load cell 150 after the load cell 150 has already been installed on a polished rod 110.

The adapter 200 installed on the load cell 150 may thus receive the load signal from the load cell 150. As will be discussed below, the load signal may be received by a load & position signal processor (or load signal processor) 544 for further processing.

In example embodiments, the adapter 200 includes an inclinometer. However, embodiments are not limited thereto. By including an inclinometer in the adapter 200, there may be no need to worry with the traditional placement of an inclinometer on the walking beam, as discussed in the Background.

Figure 4A:
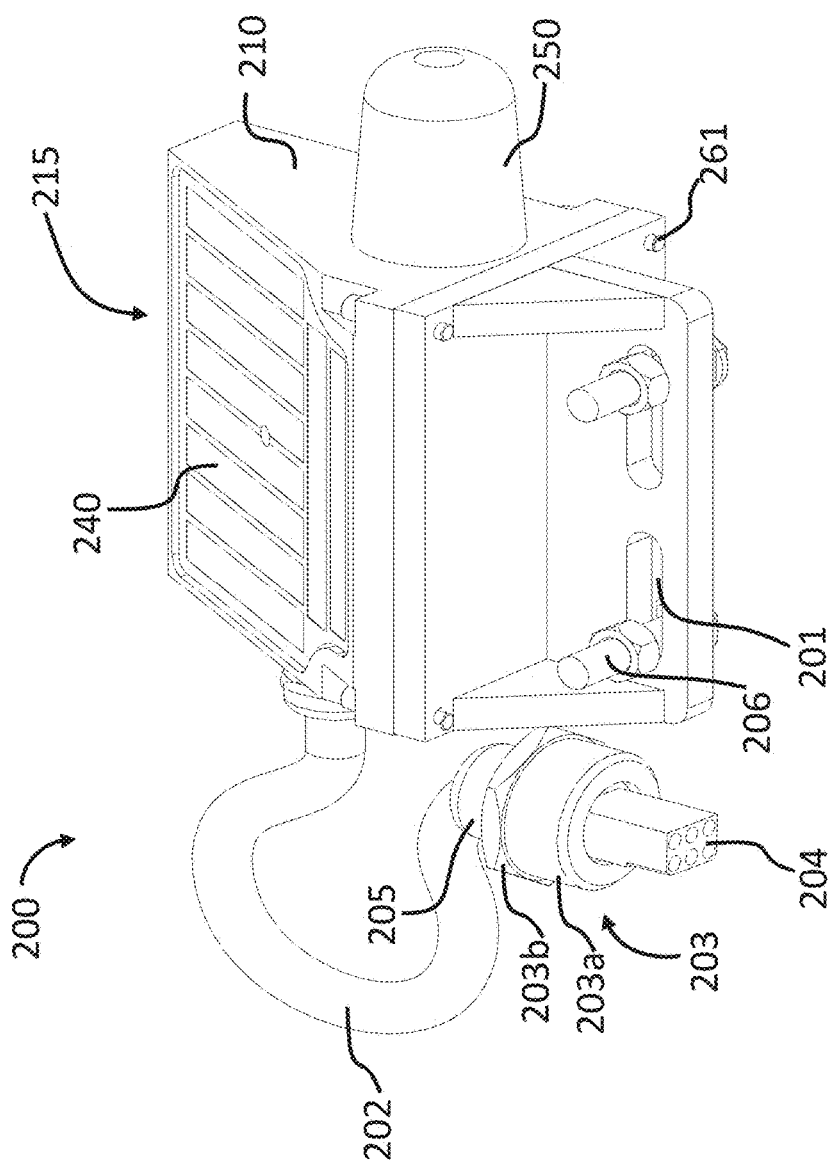
FIG. 4A shows a perspective view of a wireless load cell adapter according to an embodiment of the present invention.

For example, with reference to FIG. 4B, the adapter 200 may include a position sensor 262. The position sensor 262 may be configured to receive a power supply voltage and output a "position" signal based on a position experienced by the position sensor 262. As will be discussed below, the adapter 200 may internally include all the circuitry necessary to process the reading from position sensor 262 and wirelessly transmit the resulting position signal to a receiver or other monitoring system. However, embodiments are not limited thereto, and in some embodiments, the adapter 200 may exclude the inclinometer, including any position sensor, and/or other sensors and associated processor(s).

In an example embodiment, the position sensor 262 may be an accelerometer that measures moving acceleration. For example, in some embodiments, the position sensor 262 may include accelerometer circuitry such as, for example, the Analog Devices™ ADXL203 accelerometer.

The position sensor 262 may output an electrical signal (a "position signal") that may be used to determine the position of the polished rod 110 and/or inclination of the walking beam 101. Such a determination may be performed by a processor such as signal processor 544 (discussed below in relation to FIG. 5).

In embodiments where the position sensor 262 is an accelerometer that measures the moving acceleration, the signal processor 544 may thereby determine the moving distance of the load cell (corresponding to the moving distance of the polished rod/horse head) according to Equation 1-1:

$$S = \int\int_{t1}^{t2} a(t)\,dt\,dt \qquad [1\text{-}1]$$

In the above Equation 1-1, 'S' represents the moving distance of the load cell, 'a(t)' represents the acceleration of the load cell as measured by position sensor 262, 't1' represents the starting time for the integral function, and 't2' represents the end time for the integral function. According to this equation, the moving distance of the load cell from time 't1' to time 't2' equals two times the integral of the measured acceleration from time 't1' to time 't2'.

With reference to FIG. 1, a position of the polished rod 110 and/or angle of the walking beam 101 may thereby be determined according to the calculated moving distance of the load cell and known parameters of the rod pumping system 100, such as, for example, the lengths of the walking beam 101, horsehead 102, harness 120, polished rod 110, and position of pivot point 104, according to common trigonometric equations that are known in the art.

In some embodiments, the position sensor 262 may include circuitry to measure the moving angle directly by, for example, sensing changes to tilt. This may also be accomplished with an accelerometer such as the Analog Devices™ ADXL203 accelerometer, although this example is provided for illustration only and embodiments are not limited thereto.

With reference to FIG. 4F, in some embodiments, the outer shell 210 of the adapter 200 is metal and includes a slanted portion 215. This slanted portion 215 may include solar panel(s) 240 for providing power to the adapter. In contrast to other elements of the adapter 200, the solar panels 240 may be mounted externally on the outer shell 210. In one embodiment, the solar panels 240 may be connected in parallel to a charger and an electrical power storage 241 such as a battery. Furthermore, the solar panels 240, power storage 241, the charger and load signal processor (on circuit board 245), and a wireless transmitter 251 may be successively connected in parallel, as will be discussed in more detail below with regard to the embodiment shown in FIG. 5. The solar panels may produce current from incident light.

With reference to FIG. 4F, the slanted portion 215 of the adapter 200 including at least the solar panels 240 and power storage 241 may form a power supply unit 260. In some embodiments, this power supply unit 260 may be easily attachable and detachable from the rest of the adapter 200, for example, through use of bolts 261. In this way, the adapter 200 can provide an integrated, encapsulated package that has all the desired functionality while still allowing the power storage/battery 241 to be easily replaced as it ages.

In some embodiments, the wireless transmitter 251 is mounted inside the outer shell 210 on circuit board 245 and includes an antenna 252 that protrudes outside the outer shell and that is protected from the outdoor elements by an antenna cover 250. The antenna cover 250 may be plastic or another material that limits interference with wireless signals. The wireless transmitter 251 may transmit load data to, for example, a nearby receiver, station, or other device that can monitor the measured load on the polished rod 110.

For example, with reference to FIG. 1, in some embodiments of the invention, the wireless transmitter 251 may transmit data via the antenna to, for example, a nearby receiver, station, or other device that can monitor the measured load on the polished rod 110, position of the polished rod 110, and/or incline of the walking beam 101. For example, the wireless transmitter 551 may transmit modulated position/incline and load data to a wireless receiver module 401 connected to a rod pump controller 400 in order that the rod pumping system 100 may be appropriately controlled and monitored.

Figure 5:
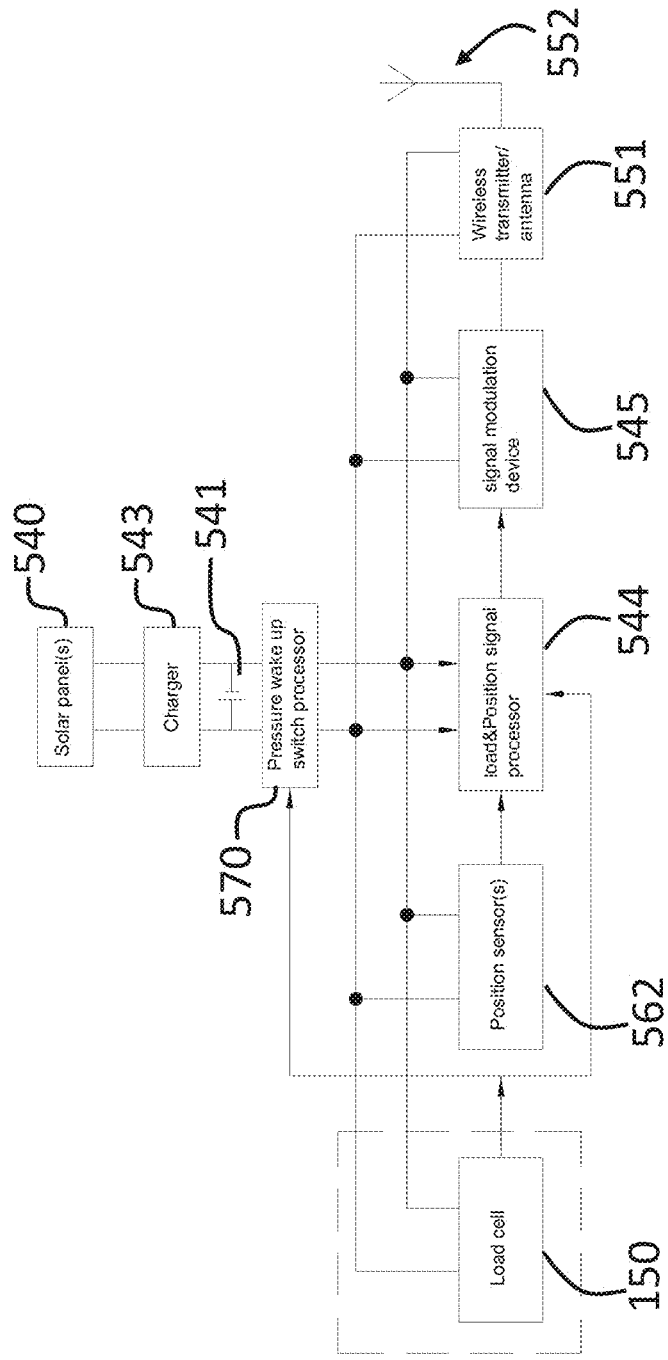
FIG. 5 illustrates a block diagram of circuitry of a load cell and a wireless load cell adapter according to an embodiment of the present invention.

FIG. 5 illustrates a schematic circuit configuration of the adapter according to some embodiments of the invention. The circuit configuration may include solar panel(s) 540, a charger 543, a power storage/battery 541, a load and position signal processor 544, a signal modulation device 545, a wireless transmitter 551, antenna 552, load cell 150 (external), and position sensor(s) 562. While FIG. 5 labels processor 544 as a load & position signal processor, processor 544 may merely serve as a load processor in embodiments that exclude a position sensor. Furthermore, while FIG. 5 shows signal modulation device 545 separate from the wireless transmitter 551, in some embodiments, the signal modulation device 545 may be included as part of the wireless transmitter 551. In some embodiments, the modulation device 545 or wireless transmitter 551 can include an amplifier and/or other transmission equipment. In some embodiments, the charger 543 may be included on the same circuit board as circuitry for the signal modulation device 545 and/or load and position signal processor 544. The solar panel 540 is used to generate and supply electricity to the adapter, and may comprise a set of solar photovoltaic modules electrically connected and mounted to an outer shell of the adapter. The solar panel 540 may be connected to the charger 543 and the power storage/battery 541. The charger 543 may receive current from the solar panel 540 and charge the power storage/battery 541 with energy based on this current. The power storage/battery 541 is further connected to the load and position signal processor 544, the signal modulation device 545, the load cell 150 (externally through the cable), and the position sensor(s) 562, to supply power to those elements.

The load cell 150 (external to the adapter 200 as illustrated by the dotted lines in FIG. 5) may transmit load signals to the load and position signal processor 544. And, as discussed above, the position sensor(s) 562 may be configured to measure and transmit a position signal based on a position experienced by the position sensor(s) 562 (such as acceleration) to the load and position signal processor 544.

The load and position signal processor 544 may receive the load signal from the load cell 150, calculate a load experienced by the polished rod 110 based on these load signals, and output this processed load signal data. For example, the load signal processor 544 may perform this calculation based on a recognition that the load experienced by the polished rod 110 is proportional to the load signal from load cell 150. The processed load signal data may be further transmitted to the load signal modulation device 545 (which, in some embodiments, is included in wireless transmitter 551) to perform signal modulation. After the load signal data is processed and modulated, it may be amplified and transmitted via the wireless transmitter/antenna 551.

Furthermore, the load and position signal processor 544 may receive the signal(s) from the position sensor(s) 562, calculate a position of the polished rod 110 and/or inclination of the walking beam 101 based on the signal(s) from the position sensor(s) 562 and according to Equation 1-1 discussed above, and output this processed position and/or inclination data. As with the processed load signal data, the processed position and/or inclination data may be further transmitted to the signal modulation device 545 to perform signal modulation. After the position and/or inclination data is processed and modulated, it may be amplified and transmitted via the wireless transmitter/antenna 551. Therefore, in some embodiments, the adapter may transmit both the load and position data.

In embodiments of the present invention, as the solar panel 540 supplies power to the charger 543 and the power storage/battery 541, any electric cable connected to an exterior power source is eliminated. Therefore, embodiments in accordance with the present invention may improve the energy efficiency and facilitate the maintenance of the adapter equipment. In embodiments of the invention, the above circuitry may include non-transitory computer readable storage mediums for providing appropriate instructions to the processor(s).

The solar panels 540, charger 543, and electrical power storage 541 may help to ensure stable or constant current for the adapter even during cloudy days, night time, or other low-light situations. In some embodiments of the invention, the power supply may connect to the position sensor 562, load and position signal processor 544, and signal modulation device 545 in parallel.

In some embodiments of the invention, a special signal processing application is used in order to decrease energy loss. For example, there may be no contact switch provided on the adapter to control power to the circuitry. Instead, there may be a wake up switch processor between the charger, battery and other circuitry which consumes energy (such as the load cell 150). This wake up switch processor may "turn on" the battery and the rest of the energy consumption circuitry and serve the function of a switch. By using a wake up switch processor instead of a contact switch, there is no possibility for water to enter the interior of the adapter through such a switch. Furthermore, accidental switches to "power on" may be avoided during transport. The wake up switch processor may be located on a same circuit board (e.g., circuit board 245 of FIG. 4F) as other circuitry.

As shown in FIG. 5, in some embodiments, the wake up switch processor may include a pressure wake up switch processor 570. The pressure wake up switch processor 570 may be configured to measure the pressure on the adapter once every several seconds. For example, once every two seconds, the pressure wake up switch processor 570 may provide a voltage to the load cell 150 from power storage 451 and measure the pressure based on the load signal transmitted from the load cell 150 for a short time of, e.g., 20 milliseconds. When, for example, the adapter is installed on the polished rod and has a pressure corresponding therewith, the pressure wake up switch processor may detect this pressure and fully "turn on" power to the circuitry.

Any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Embodiments set forth below correspond to examples of adapter implementations of the present invention. However, the various teachings of the present invention can be applied in more than the embodiments set forth below as would be recognized by one skilled in the art.

As will be appreciated by those skilled in the art, changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. An adapter for a load cell in a rod pump system, the rod pump system having a rod clamp fixed to a top of a vertical polished rod and a clamping bar fixed to a hanger harness attached to a horsehead, the load cell on the polished rod between the clamping bar and the rod clamp, the adapter comprising:

an outer shell including a mounting portion configured to attach to the load cell;

a power supply configured to provide power to the adapter and the load cell, the power supply including a solar panel on the outer shell;

a cable configured to connect to the load cell, wherein the cable is external to both the load cell and the outer shell of the adapter, wherein the adapter is configured to provide power to the load cell via the cable, and the adapter is configured to receive a load signal from the load cell via the cable;

a signal processor configured to receive and process the load signal and to output load signal data representative of a load experienced by the load cell; and a wireless transmitter to transmit the load signal data, wherein the adapter is external to the load cell, wherein the mounting portion is on a side of the outer shell opposite to that of the solar panel, the mounting portion including two elongated openings and a horizontal flat panel configured to fasten directly to and flush with a horizontal platform of the load cell with bolts, the horizontal platform being a protrusion of the load cell, wherein the solar panel faces outwardly from the load cell on the polished rod.

2. The adapter of claim 1, further comprising:
a modulator configured to receive the load signal data from the signal processor, to modulate the load signal data, and to output the modulated load signal data to the wireless transmitter, wherein the wireless transmitter is configured to wirelessly transmit the modulated load signal data.

3. The adapter of claim 1, further comprising:
the power supply further including:
   a battery internal to the outer shell of the adapter;
   a charger internal to the outer shell of the adapter and electrically connected to the solar panel and the battery,
wherein the charger is configured to receive current from the solar panel and to charge the battery.

4. The adapter of claim 1, further comprising:
a wake-up processor configured to control power from the power supply, wherein the wake-up processor is configured to measure the load signal and to provide power from the power supply when the load signal indicates that the adapter is attached to the load cell installed on the polished rod.

5. The adapter of claim 1, further comprising:
the cable including at least two conductive pathways, one of the two conductive pathways to receive the load signal from the load cell, and the other of the two conductive pathways to provide power to the load cell.

6. The adapter of claim 5, further comprising:
the cable further including a threaded portion configured to threadedly connect to a terminal of the load cell.

7. The adapter of claim 1, wherein:
the outer shell includes a slanted structure, the slanted structure being slanted relative to a bottom of the outer shell, and the solar panel on the slanted structure of the outer shell.

\* \* \* \* \*